United States Patent [19]

Lancaster et al.

[11] Patent Number: 4,532,100

[45] Date of Patent: Jul. 30, 1985

[54] BLOWN NYLON FILM AND PROCESS FOR THE PREPARATION THEREOF

[75] Inventors: Gerald M. Lancaster, Freeport; Stephen M. Hoenig, Angleton, both of Tex.

[73] Assignee: The Dow Chemical Company, Midland, Mich.

[21] Appl. No.: 492,065

[22] Filed: May 6, 1983

[51] Int. Cl.$^3$ ............................................. B29D 7/24
[52] U.S. Cl. ................................... 264/564; 264/143; 264/171; 425/326.1; 525/183
[58] Field of Search .................. 264/564, 171, 143; 425/326.1; 525/183

[56] References Cited

U.S. PATENT DOCUMENTS

| | | | |
|---|---|---|---|
| 3,373,223 | 3/1968 | Armstrong | 525/183 |
| 3,449,299 | 6/1969 | Schneider et al. | 264/564 |
| 3,819,792 | 6/1974 | Ono et al. | 264/564 |
| 3,836,620 | 9/1974 | Bhuta et al. | 264/171 |
| 3,873,667 | 3/1975 | Preto et al. | 525/183 |
| 4,410,482 | 10/1983 | Subramanian | 264/171 |

FOREIGN PATENT DOCUMENTS

| | | | |
|---|---|---|---|
| 49-34462 | 9/1974 | Japan | 264/171 |
| 50-53454 | 5/1975 | Japan | 425/326.1 |
| 52-3655 | 1/1977 | Japan | 264/564 |
| 53-42255 | 4/1978 | Japan | 264/564 |

*Primary Examiner*—Jeffery Thurlow
*Attorney, Agent, or Firm*—Bruce M. Kanuch

[57] ABSTRACT

The preparation of monolayer blown nylon films on equipment conventionally used in the manufacture of blown polyethylene film is facilitated by the intimate admixture of a minor proportion by weight of a random ethylene/ethylenically unsaturated carboxylic acid copolymer into the nylon resin composition from which said blown nylon film is to be manufactured.

21 Claims, No Drawings

BLOWN NYLON FILM AND PROCESS FOR THE PREPARATION THEREOF

BACKGROUND OF THE INVENTION

In one aspect, the present invention relates to certain monolayer, biaxially oriented blown nylon film materials and to a process for the preparation thereof. In another aspect, such invention relates to a process for the preparation of such films on conventional polyethylene blown film equipment. In a further aspect, this invention also relates to an improved process for the preparation of blown monolayer nylon films on specially designed extrusion equipment which is conventionally used in the preparation of monolayer blown nylon films.

Polyamide resins, commonly referred to as nylon, and blends thereof with various other polymeric materials such as polyethylene, graft or random copolymers of ethylene with ethylenically unsaturated carboxylic acids or anhydrides, ethylene/vinyl acetate copolymers, ethylene/alkyl acrylate copolymers and the like are well known in the art and have been proposed for use in the fabrication of a variety of thermoplastic articles such as, for example, various molded parts, and extruded articles including fibers, filaments, tubing, bottles, films, sheets, wire coatings and the like. See, for example, British Pat. No. 998,439; British Pat. No. 1,262,802; British Pat. No. 1,464,036; British Pat. No. 1,552,352; U.S. Pat. Nos. 3,093,255; 3,250,823; 3,373,223; 3,373,224; 3,472,916; 3,668,274; 3,676,400; 3,681,216; 3,822,227; 3,845,163; 3,963,799; 3,997,625; 4,018,733; 4,035,438; 4,086,295; 4,100,238; 4,105,709; 4,160,790; 4,174,358; 4,251,424; 4,261,473; 4,287,315; 4,305,865; and 4,321,336; Japanese Pat. No. J7 4049-179; EPO Application No. 27191; and published Japanese Patent Applications Nos. J5 0142-675; J5 4155-270; J5 4155-272; J5 4016-576; J5 5034-956; J5 6004-652 and J5 6062-864.

Historically, certain features or characteristics of polyamide resins have tended to hinder the manufacture of polymer film structures therewith. For example, such resins typically have relatively low melt tension properties and relatively low melt viscosity at the temperatures involved in extrusion processing and particularly at high rates of shear. Such characteristics have been especially troublesome relative to the manufacture of blown polyamide film structures, particularly in the case of monolayer blown polyamide film structures. In particular, an extruded, molten web or mass of such polymer generally fails to have sufficient strength to suitably support a hot film bubble as is necessary in conventional blown film manufacturing operations. Accordingly, it has been common practice in the past to resort to special processing techniques (e.g., cast film preparation followed by special tentering/stretching operations), special equipment design (e.g., special die designs), special extra high molecular weight polyamide compositions, special multiple layered film structures and the like when the objective was to prepare a biaxially oriented polyamide film structure.

In view of the foregoing, it would be highly desirable to provide a means for improving the processability of polyamide resin compositions and to thereby facilitate and simplify the fabrication of biaxially oriented, blown film structures therefrom. Moreover, it would also be highly desirable to provide a means or process by which biaxially oriented monolayer polyamide film structures could be suitably prepared using conventional polyolefin blown film manufacturing equipment.

SUMMARY OF THE INVENTION

In accordance with the present invention, it has now been found that certain blends of a major proportion of a polyamide resin with a minor proportion of a random copolymer of ethylene with an ethylenically unsaturated caboxylic acid can be suitably processed into biaxially oriented, monolayer blown film structures on equipment conventionally employed to manufacture blown polyethylene film structures. In addition, it has also been found that the incorporation of a minor proportion of a random copolymer of ethylene with an ethylenically unsaturated carboxylic acid into a major proportion of a polyamide resin substantially improves the processability of said polyamide or other types of equipment used in the industry for the preparation of monolayer blown polyamide film structures. Accordingly, the present invention in one aspect is a process for the preparation of a biaxially oriented monolayer polyamide film structure which process comprises intimately admixing from about 1 to about 50 parts by weight of a random ethylene/ethylenically unsaturated carboxylic acid copolymer with from about 50 to about 99 parts by weight of a polyamide resin and fabricating said intimate admixture into a monolayer blown film structure.

In another aspect, the present invention is an improvement in an extrusion process for the preparation of a blown monolayer film of a polyamide composition wherein said improvement comprises the intimate incorporation into said polyamide composition, either prior to or during the blown film extrusion of said composition, of a minor proportion by weight of a random copolymer of a major proportion by weight of ethylene with a minor proportion by weight of an ethylenically unsaturated carboxylic acid.

The polyamide film structures prepared in the foregoing fashion have excellent strength properties in both the machine and transverse directions as well as having excellent oxygen barrier properties. In addition, the use of the subject polymer blends for blown film manufacturing purposes is particularly advantageous since said blends have been found to have a substantially broader "operating window" (i.e., in terms of suitable melt temperature operating ranges) than polyamide compositions not containing the indicated ethylene/ethylenically unsaturated carboxylic acid copolymer component.

DETAILED DESCRIPTION OF THE INVENTION

The polyamide resins which are employed in the practice of the present invention are well known in the art and are commonly referred to as nylon resins. Representative examples of such polyamide resins are described in U.S. Pat. Nos. 2,071,250; 2,071,251; 2,130,523; and 2,130,948. Such polyamide resins are typically derived by the polymerization of one or more saturated dibasic acids such as, for example, oxalic acid, succinic acid, adipic acid, suberic acid, sebacic acid, etc., with one or more saturated diamines such as, for example, hydrazine, ethylene diamine, tetramethylene diamine, pentamethylene diamine, hexamethylene diamine, decamethylene diamine, and the like; by the polymerization of one or more monoamino-monocarboxylic acids, or the cyclic lactams thereof, such as, for example, 6- aminohexanoic acid, 11-aminoundecanoic acid, 12-aminostearic acid and the like; or by the interpolymerization of a mixture of one or more diamines, one or more dicarboxylic acids and one or more monoamino-monocarboxylic acids.

Preferred polyamide resins for use in the practice of the present invention include polycaprolactam (nylon-6), polyhexamethylene adipamide (nylon-6,6), polyhexamethylene sebacamide (nylon-6,10), polyaminoundecanoic acid (nylon-11), polyamino-dodecanoic acid (nylon-12) or mixtures thereof.

As has been previously noted, the aforementioned polyamide resin typically constitutes a major proportion by weight (i.e., from about 50 to about 99 weight percent) of the polymer blends employed in the practice of the present invention. Preferably said polyamide resin constitutes from about 70 to about 95 (most preferably from about 75 to about 90) weight percent of such polymer blends.

Random ethylene/ethylenically unsaturated carboxylic acid copolymers which are suitably employed in the practice of the present invention include those which are derived from the addition polymerization of a monomer mixture comprising a major proportion by weight (e.g., from about 65 to about 99, preferably from about 80 to about 98 and most preferably from about 80 to about 94, percent by weight) of ethylene and a minor proportion by weight (e.g., from about 1 to about 35, preferably from about 2 to about 20 and most preferably from about 6 to about 20, percent by weight) of an ethylenically unsaturated carboxylic acid monomer. Specific examples of such suitable ethylenically unsaturated carboxylic acids (which term includes mono- and polybasic acids, acid anhydrides, and partial esters of polybasic acids, as well as the various metallic salts thereof) are acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monometyl ether acid maleate, or ethylene glycol monophenyl ether acid maleate. The carboxylic acid monomer is preferably selected from $\alpha,\beta$-ethylenically unsaturated mono- and polycarboxylic acids and acid anhydrides having from 3 to 8 carbon atom per molecule and partial esters of such polycarboxylic acid wherein the acid moiety has at least one carboxylic acid group and the alcohol moiety has from 1 to 20 carbon atoms. Such copolymers may consist essentially of ethylene and one or more of such ethylenically unsaturated acid or anhydride comonomers or can also contain small amounts of other monomers copolymerizable with ethylene. Thus, the copolymer can contain minor proportions (e.g., from 0 to about 20 weight percent, preferably from 0 to about 10 weight percent) of other copolymerizable monomers, such as, for example, alkyl or hydroxyalkyl esters of ethylenically unsaturated monocarboxylic acids such as methyl methacrylate, ethyl acrylate, 2-hydroxyethyl acrylate, 2-ethylhexyl acrylate, isobutyl acrylate etc.; vinyl esters of saturated carboxylic acids such as vinyl acetate, vinyl propionate, vinyl butyrate and the like. Random copolymers of the general type referred to above are readily known in the art as are various methods for the preparation of same.

Especially preferred ethylene/ethylenically unsaturated carboxylic acid copolymers for use in the practice of the present invention are the normally solid random copolymers of a major proportion by weight of ethylene with from about 2 to about 15 (most preferably from about 6 to about 10) weight percent of acrylic, methacrylic or crotonic (especially acrylic acid) such as those described in U.S. Pat. Nos. 3,520,861 and 3,239,370 and the known ionomer salts thereof.

Preferably, the ethylene/ethylenically unsaturated carboxylic acid copolymers employed in the present invention are of a relatively high molecular weight as exemplified by their exhibiting a melt index of from about 0.5 to about 10 decigrams/minute (more preferably from about 1 to about 5 decigrams/minute) when measured pursuant to ASTM D-1238 Condition E.

The aforementioned ethylene/ethylenically unsaturated carboxylic acid copolymer will typically constitute a minor proportion (i.e., from about 1 to about 50 weight percent) of the polyamide blends of the present invention. Preferably said copolymer will constitute from about 5 to about 30 weight percent of said blends and most preferably said copolymer will be employed in an amount of from about 10 to about 25 weight percent in said polymer blends.

In the practice of the present invention, it has been found to be important to ensure that the aforementioned polyamide resin and ethylene/ethylenically unsaturated carboxylic acid copolymer components of the subject polymer blends be very thoroughly and intimately admixed prior to the actual fabrication of a blown polymeric film structure therefrom. Accordingly, in those instances where the extrusion equipment to be employed in the actual film fabrication operation is one having relatively poor mixing efficiency or characteristics, then it is generally desirable and advantageous to melt preblend the starting polyamide and ethylene/unsaturated carboxylic acid copolymer components together in a separate melt-form mixing operation (e.g., in a separate mixing extruder) in advance of the actual film forming operation. On the other hand, in those instances where the extrusion equipment employed in the film fabrication operation is itself of a type exhibiting good mixing characteristics (e.g., by virtue of having a relatively large length to diameter ratio, special screw configurations adapted for increased mixing efficiency etc.), then a separate preliminary melt blending/extrusion operation may not be necessary for adequate admixing of the subject polymer blends and simple dry blending of the individual blend components (e.g., in solid pellet, powder or flake form) in advance of the film extrusion operation may be all that is required in such instance.

In the actual blown film extrusion processing operation of the present invention, it has also been found to be advantageous and beneficial to operate the blown film extruder employed in a fashion which results in a temperature profile along the length of the barrel which decreases from a higher temperature at the feed end (or at some other intermediate upstream zone) of said extruder to a relatively lower temperature (but, naturally, still above the softening or melting of the polymer blend being extruded) at the die end thereof. Accordingly, the operation of said blown film extruder in such a fashion represents a particularly preferred embodiment of the present invention.

In addition to the foregoing, it has also been found to be important in the practice of the present invention to operate the subject blown film extrusion line in a fashion such that the "frost line height" of the blown nylon film "bubble" is less than 30 inches (preferably less than 15 inches) from the extruder die. As will be well recognized by the skilled artisan, the magnitude of the aforementioned "frost line height" will be a function of a variety of factors such as, for example, the temperature of the polymer melt as it exits the extruder die, the thickness of the polymer web forming the film bubble, the linear velocity of the molten polymer film web, the temperature and volumetric flow rate of any forced cooling gases (e.g., air) employed, the crystallization rate of the polymer composition employed, and the like. In this regard, it has been found to be highly advantageous and preferable to employ a chilled gaseous cooling medium (e.g., chilled air at a temperature below about 25° C., preferably below 15° C.) to cool the nylon film bubble as it exits the extruder die. In addition, it has also been found that the incorporation of the ethylene/ethylenically unsaturated carboxylic acid copolymer component of the present invention serves to substantially and dramatically increase the crystallization rate of the resulting polyamide composition (i.e., relative to what it would be in the absence of said ethylene/ethylenically unsaturated carboxylic acid copolymer component); thereby significantly facilitating the rapid crystallization thereof and thus substantially reducing the "frost line height" in the blown nylon film manufacturing operation of concern.

Following their preparation, the biaxially oriented monolayer polyamide-ethylene/ethylenically unsaturated carboxylic acid copolymer blend films prepared in accordance with the present invention can be employed in the conventional fashion in the variety of well known packaging applications which have heretofore been served by cast nylon film structures, by cast and tentered nylon film structures, by multilayered blown nylon film structures and the like.

The practice of the present invention is further illustrated by reference to the following examples thereof in which all parts and percentages are to be understood as being on a by weight basis unless otherwise indicated.

EXAMPLE 1

In this example, a twin screw Werner-Pfleiderer compounding extruder was employed to melt blend 100 parts of a nylon-6 resin (marketed by Allied Chemical Company as Capron 8207F) with 10 parts of a random ethylene/acrylic acid copolymer containing about 9.5 weight percent of acrylic acid and having a melt index of about 10 decigrams/minute as determined pursuant to ASTM D-1238, Condition E. During said melt blending operation, the indicated twin screw extruder was operated with a temperature profile along its length which gradually decreased from 420° F. (215.6° C.) at its feed end to 370° F. (187.8° C.) at the die end and the resulting extrudate, in strand form, was cooled and pelletized.

Following the above-noted melt blending and pelletizing operation, the resulting pelletized polymer blend was processed into a blown monolayer film structure using a 2½ inch diameter single screw NRM extruder having a length to diameter (L/D) ratio of 15:1 and utilizing the following operating conditions:

| | |
|---|---|
| Adapter Temperature = | 392° F. (200° C.) |
| Die Temperature = | 392° F. (200° C.) |
| Gate Temperature = | 425° F. (218.3° C.) |
| Zone 4 Temperature = | 425° F. (218.3° C.) |
| Zone 3 Temperature = | 425° F. (218.3° C.) |
| Zone 2 Temperature = | 400° F. (204.4° C.) |
| Zone 1 Temperature = | 400° F. (204.4° C.) |
| Melt Temperature = | 422.6° F. (217° C.) |

-continued

| | |
|---|---|
| Screw Speed = | 200 rpm |
| Current = | 10 amperes |
| Die Pressure = | 1150 psi |
| Haul-Off Rate = | 21 feet per minute |
| Cooling Air Temperature = | 53.6° F. (12° C.) |
| Layflat Width = | 9 inches |
| Thickness = | 1.7 mils |
| Frostline Height = | 10 inches |

Following its preparation in the foregoing fashion, the resulting film was studied and tested to determine and evaluate the physical properties thereof. The results of such testing and evaluations were as follows:

| | |
|---|---|
| Dart Impact Strength[1] (grams) | 308 |
| Gardner Clarity[2] (% transparency) | 42.8 |
| 20° Gloss[3] | 21.2 |
| 40° Gloss[3] | 42.8 |
| Haze[4] (%) | 19.1 |
| Elmendorf Tear[5], | |
| Machine Direction (MD) (grams) | 90 |
| Transverse Direction (TD) (grams) | 51 |
| Tensile Strength[6], | |
| MD (psi) | 14,265 |
| TD (psi) | 11,915 |
| Tensile Yield[6], | |
| MD (psi) | 5,500 |
| TD (psi) | 5,070 |
| Elongation[6], | |
| MD (%) | 430 |
| TD (%) | 410 |
| 2% Secant Modules[7], | |
| MD (psi) | 105,500 |
| TD (psi) | 100,900 |
| Toughness[7], | |
| MD (lb/in$^3$) | 2,740 |
| TD (lb/in$^3$) | 2,212 |
| Oxygen Transmission, (cc · mils/100 in$^2$ · 24 hr · atm) | 3.20 |

[1] ASTM D1709-67
[2] ASTM D1746
[3] ASTM D2457
[4] ASTM D1003-52
[5] ASTM D1922
[6] ASTM D882, D638
[7] ASTM D882

COMPARATIVE EXPERIMENT

An attempt was made to repeat the blown film preparation procedure of Example 1 using pure nylon-6 resin (Allied Chemical Company's Capron 8207F) in place of the nylon-6/EAA blend which had been employed in Example 1. Such attempt proved to be unsuccessful since the extruded polymer mass could not be satisfactorily strung up due to inadequate melt strength.

EXAMPLES 2–4

The procedures of Example 1 were repeated using three different random ethylene/acrylic acid (EAA) copolymers in place of the 9.5 weight percent acid, 10 melt index EAA copolymer which had been employed in Example 1. More specifically, the polymer blend employed in Example 2 was composed of 100 parts of Allied Chemical Company's Capron 8207F film extrusion grade nylon-6 resin and 10 parts of a random ethylene/acrylic acid copolymer having an acrylic acid content of about 12 weight percent and a melt index of 0.8 decigrams per minute; the polymer blend employed in Example 3 was composed of 100 parts of Allied's Capron 8207F nylon-6 resin and 10 parts of a random ethylene/acrylic acid copolymer having an acrylic acid content of about 6.5 weight percent and a melt index of about 2 decigrams per minute (available from The Dow Chemical Company as EAA 452); and the polymer blend employed in Example 4 was composed of 100 parts of Allied's Capron 8207F nylon-6 resin and 10 parts of a random ethylene/acrylic acid copolymer having an acrylic acid content of about 9.5 weight percent and a melt index of 2 decigrams/minute.

The properties of the three resulting monolayer blown film structures were as set forth below.

|  | Example 2 | Example 3 | Example 4 |
|---|---|---|---|
| Dart Impact[1] (grams) | 524 | 773 | 844 |
| Gardner Clarity[2] (% transparency) | 9.1 | 45.9 | 55.7 |
| 20° Gloss[3] | 8.4 | 29.4 | 46.9 |
| 40° Gloss[3] | 24.7 | 45.9 | 50.5 |
| Haze[4] (%) | 29.5 | 21.6 | 19.4 |
| Elmendorf Tear[5], | | | |
| Machine Direction (MD) (grams) | 32 | 70.4 | 60.8 |
| Transverse Direction (TD) (grams) | 64 | 76.8 | 70.4 |
| Tensile Strength[6] | | | |
| MD (psi) | 14,735 | 12,990 | 14,415 |
| TD (psi) | 13,970 | 13,000 | 13,390 |
| Tensile Yield[6] | | | |
| MD (psi) | 6,005 | 6,615 | 6,795 |
| TD (psi) | 5,185 | 6,670 | 6,565 |
| Elongation[6], | | | |
| MD (%) | 440 | 400 | 420 |
| TD (%) | 410 | 410 | 400 |
| 2% Secant Modulus[7] | | | |
| MD (psi) | 114,200 | N.D.* | N.D.* |
| TD (psi) | 114,900 | N.D.* | N.D.* |
| Toughness[7], | | | |
| MD | 2,884 | 2,487 | 2,678 |
| TD | 2,605 | 2,479 | 2,385 |
| Oxygen Transmission (cc · mils/100 in$^2$ · 24 hr · atm) | 3.00 | N.D.* | N.D.* |

*N.D. = Not Determined
[1]ASTM D1709-67;
[2]ASTM D1746;
[3]ASTM D2457;
[4]ASTM D1003-52;
[5]ASTM D1922;
[6]ASTM D882, D638
[7]ASTM D882

While the subject matter hereof has been described by reference to certain specific embodiments and examples such fact is not to be interpreted as in any way limiting the scope of the presently claimed invention.

What is claimed is:

1. A process for the preparation of a biaxially oriented monolayer polyamide film structure which process comprises preparing an intimate mixture consisting essentially of from about 1 to about 50 parts by weight of a random ethylene/ethylenically unsaturated carboxylic acid copolymer with from about 50 to about 99 parts by weight of a polyamide resin and fabricating said admixture into a monolayer blown film structure.

2. The process of claim 1 wherein the ethylene/ethylenically unsaturated carboxylic acid copolymer is a random copolymer of a major proportion by weight of ethylene with a minor proportion by weight of an ethylenically unsaturated carboxylic acid monomer.

3. The process of claim 1 wherein the random ethylene/ethylenically unsaturated carboxylic acid copolymer is derived from the addition polymerization of a monomer mixture comprising from about 65 to about 99 weight percent of ethylene and from about 1 to about 35 weight percent of an ethylenically unsaturated carboxylic acid monomer.

4. The process of claim 1 wherein the random ethylene/ethylenically unsaturated carboxylic acid copolymer is derived from a monomer mixture comprising from about 80 to about 98 weight percent of ethylene and from about 2 to about 20 weight percent of an ethylenically unsaturated carboxylic acid monomer.

5. The process of claim 1 wherein the random ethylene/ethylenically unsaturated carboxylic acid copolymer comprises, in copolymerized form, a major proportion by weight of ethylene and from about 2 to about 15 weight percent of acrylic, methacrylic or crotonic acid.

6. The process of claim 1 wherein the random ethylene/ethylenically unsaturated carboxylic acid copolymer comprises, in copolymerized form, a major proportion by weight of ethylene and from about 6 to about 10 weight percent of acrylic, methacrylic or crotonic acid.

7. The process of claim 1 wherein the random ethylene/ethylenically unsaturated carboxylic acid copolymer has a melt index of from about 0.5 to about 10 decigrams/minute as determined pursuant to ASTM D 1238, Condition E.

8. The process of claim 1 wherein the polyamide resin is selected from the group consisting of nylon-6, nylon-66, nylon-610, nylon-11 and nylon-12.

9. The process of claim 1 wherein the polyamide resin is nylon-6.

10. The process of claim 1 wherein the polyamide constitutes from about 70 to about 95 weight percent of the polyamide-ethylene/ethylenically unsaturated carboxylic acid copolymer blend and wherein the ethylene/ethylenically unsaturated carboxylic acid copolymer constitutes from about 5 to about 30 weight percent of said blend.

11. The process of claim 1 wherein the polyamide resin and the ethylene/ethylenically unsaturated carboxylic acid copolymer are melt preblended in a separate extrusion operation conducted prior to the blown film extrusion operation.

12. The process of claim 11 wherein the separate melt preblending extrusion operation includes the steps of solidification and pelletization of the polyamide-ethylene/ethylenically unsaturated carboxylic acid copolymer blend.

13. The process of claim 1 wherein the extruder employed in the blown film manufacturing operation is operated with a temperature profile along the barrel length which gradually decreases from a relatively higher temperature at its feed end to a relatively lower temperature at the die end thereof.

14. The process of claim 1 wherein the blown film manufacturing equipment employed is of a type which is conventionally employed for the manufacture of blown films from low density polyethylene resins.

15. The process of claim 1 wherein the blown film manufacturing operation is conducted such that the frost line height of the polymer film bubble is less than 30 inches from the extruder die.

16. The process of claim 15 wherein the frost line height is less than 15 inches.

17. The process of claim 1 wherein the random ethylene/ethylenically unsaturated carboxylic acid copolymer is derived from the addition polymerization of a monomer mixture comprising from about 80 to about 94 weight percent of ethylene and from about 6 to about 20 weight percent of an ethylenically unsaturated carboxylic acid monomer.

18. The process of claim 1 wherein the polyamide constitutes from about 75 to about 90 weight percent of the polyamide-ethylene/ethylenically unsaturated carboxylic acid copolymer blend and wherein the ethylene/ethylenically unsaturated carboxylic acid copolymer constitutes from about 10 to about 25 weight percent of said blend.

19. The process of claim 1 wherein a chilled gaseous cooling medium is employed to cool the film bubble as it exits the extruder die.

20. The process of claim 19 wherein the chilled gaseous cooling medium is air at a temperature of less than B 25° C.

21. The process of claim 19 wherein the chilled gaseous cooling medium is air at a temperature of less than 15° C.

* * * * *